(12) United States Patent
Mehawej et al.

(10) Patent No.: US 6,849,672 B2
(45) Date of Patent: Feb. 1, 2005

(54) SUPERABSORBENT THERMOPLASTIC COMPOSITION AND ARTICLE INCLUDING SAME

(75) Inventors: Fouad D. Mehawej, Forest Lake, MN (US); Eugene R. Simmons, Vadnais Heights, MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 157 days.

(21) Appl. No.: 10/050,375

(22) Filed: Jan. 15, 2002

(65) Prior Publication Data

US 2003/0134552 A1 Jul. 17, 2003

(51) Int. Cl.[7] .............................. C08J 3/00; C08K 9/00; C08L 83/00; C08F 36/04; C08G 81/02
(52) U.S. Cl. ...................... 523/200; 523/105; 523/111; 523/201; 523/202; 524/366; 524/376; 524/379; 524/386; 524/474
(58) Field of Search .................................. 523/200, 105, 523/111, 201, 202; 524/366, 376, 379, 386, 474

(56) References Cited

U.S. PATENT DOCUMENTS

| | | |
|---|---|---|
| 5,143,961 A | 9/1992 | Scholl et al. |
| 5,281,207 A | 1/1994 | Chmielewski et al. |
| 5,567,744 A | 10/1996 | Nagata et al. |
| 5,731,365 A | 3/1998 | Engelhardt et al. |
| 5,876,855 A | 3/1999 | Wong et al. |
| 5,942,569 A | 8/1999 | Simmons et al. |
| 6,051,748 A | 4/2000 | Auguste et al. |

FOREIGN PATENT DOCUMENTS

| | | |
|---|---|---|
| EP | 0 378 799 | 7/1990 |
| EP | 0 554 832 | 8/1993 |
| EP | 0 863 184 | 9/1998 |
| EP | 0 919 590 | 6/1999 |
| EP | 1 013 291 A1 | 6/2000 |
| FR | 2 730 242 | 8/1996 |
| JP | 6-80806 A | 3/1994 |
| WO | WO 93/22048 | 11/1993 |
| WO | WO 93/22998 | 11/1993 |
| WO | WO 98/27559 A1 | 6/1998 |
| WO | WO 99/57201 | 11/1999 |
| WO | WO 01/41818 | 6/2001 |
| WO | WO 01/55276 | 8/2001 |
| WO | WO 01/57103 | 8/2001 |
| WO | WO 01/59025 | 8/2001 |

OTHER PUBLICATIONS

Sumitomo Seika, Super Absorbent Polymer Aqua Keep, Product Literature, Jan., 2000, 13 pages.

*Primary Examiner*—Patrick D. Niland

(57) ABSTRACT

A thermoplastic composition that includes from about 1% by weight to 25% by weight block copolymer having the formula (A-B)x where the A block includes polyvinylarene, the B block includes poly(monoalkenyl) and x is an integer of at least one, spherical superabsorbent particles comprising polyacrylate, and plasticizing oil, the composition exhibiting water gel time of no greater than 2 minutes, a viscosity of no greater than 100,000 centipoise and a wet tensile strength of at least 15 g/in$^2$.

41 Claims, No Drawings

US 6,849,672 B2

SUPERABSORBENT THERMOPLASTIC COMPOSITION AND ARTICLE INCLUDING SAME

BACKGROUND OF THE INVENTION

The invention is directed to increasing absorbency in superabsorbent thermoplastic composition.

Water-insoluble, water swellable hydrogel-forming absorbent polymers, also referred to as superabsorbent polymers, are capable of absorbing large quantities of liquids such as water, body fluids (e.g., urine, blood), industrial fluids and household fluids and are further capable of retaining such absorbed liquids under moderate pressures.

Superabsorbent polymers are used in a variety of absorbent articles including, e.g., disposable diapers, feminine napkins, tissues, wipes and wound dressings. In many applications, the function of the absorbent article is to absorb and hold a relatively large volume of liquid, preferably as quickly as possible.

SUMMARY

In one aspect, the invention features a thermoplastic composition that includes from about 1% by weight to 25% by weight block copolymer having the formula (A-B)x or A-B-A where the A block comprises polyvinylarene, the B block comprises poly(monoalkenyl), and x is an integer of at least one, from about 45% by weight to about 75% by weight superabsorbent polymer particles that include polyacrylate and having a median particle diameter of from 20 $\mu$m to 30 $\mu$m, and from about 15% by weight to about 40% by weight plasticizing oil. In one embodiment, the thermoplastic composition further includes surfactant. In another embodiment, the thermoplastic composition further includes from about 1% by weight to about 5% by weight surfactant. In some embodiments, the thermoplastic composition includes from 60% by weight to about 75% by weight the superabsorbent polymer. In one embodiment, the block copolymer is selected from the group consisting of styrene-isoprene-styrene, styrene-ethylene-butylene-styrene, styrene-ethylene-propylene-styrene, styrene-butadiene-styrene and combinations thereof.

In some embodiments, the composition exhibits a water gel time of no greater than 2 minutes, no greater than 1.5 minutes or no greater than 1 minute. In some embodiments, the composition exhibits a 0.9% saline solution gel time of no greater than 4 hours, no greater than 1 hour, no greater than 25 minutes, no greater than 10 minutes or no greater than 5 minutes.

In another embodiment, the composition exhibits an absorbent capacity of at least 60 g water/g of composition, at least 70 g water/g of composition, at least 90 g water/g of composition at least 100 g water/g of composition or at least 110 g water/g of composition.

In some embodiments, the composition exhibits an absorbent capacity of at least 25 g 0.9% saline solution/g of composition, at least 30 g 0.9% saline solution/g of composition or at least 35 g 0.9% saline solution/g of composition.

In one embodiment, the thermoplastic composition includes block copolymer having the formula (A-B)x or A-B-A where the A block comprises polyvinylarene, the B block comprises poly(monoalkenyl), and x is an integer of at least one, superabsorbent particles that includes polyacrylate and having a median particle diameter of from 20 $\mu$m to 30 $\mu$m and plasticizing oil, and the composition exhibits a water gel time of no greater than 2 minutes. In some embodiments, the block copolymer is selected from the group consisting of styrene-isoprene-styrene, styrene-ethylene-butylene-styrene, styrene-ethylene-propylene-styrene, styrene-butadiene-styrene and combinations thereof.

In another embodiment, the thermoplastic composition includes block copolymer having the formula (A-B)x or A-B-A where the A block comprises polyvinylarene, the B block comprises poly(monoalkenyl), and x is an integer of at least one, superabsorbent particles that include polyacrylate and having a median particle diameter of from 20 $\mu$m to 30 $\mu$m and plasticizing oil, and the composition exhibits a 0.9% saline solution gel time of no greater than 1 hour.

In other embodiments, the thermoplastic composition includes block copolymer having the formula (A-B)x or A-B-A where the A block comprises polyvinylarene, the B block comprises poly(monoalkenyl), and x is an integer of at least one, superabsorbent particles that include polyacrylate and having a median particle diameter of from 20 $\mu$m to 30 $\mu$m and plasticizing oil and the composition exhibits an absorbent capacity of at least 70 g water/g of composition.

In some embodiments, the thermoplastic composition includes block copolymer having the formula (A-B)x or A-B-A where the A block comprises polyvinylarene, the B block comprises poly(monoalkenyl), and x is an integer of at least one, superabsorbent particles that includes polyacrylate and having a median particle diameter of from 20 $\mu$m to 30 $\mu$m and plasticizing oil, and the composition exhibits an absorbent capacity of at least 25 g 0.9% aqueous saline solution/g of composition.

In other embodiments, the thermoplastic adhesive composition that includes from about 1% by weight to 25% by weight block copolymer having the formula (A-B)x or A-B-A where the A block comprises polyvinylarene, the B block comprises poly(monoalkenyl), and x is an integer of at least one, from about 45% by weight to about 75% by weight superabsorbent polymer particles that include polyacrylate and having a median particle diameter of from 20 $\mu$m to 30 $\mu$m, tackifying agent and from about 15% by weight to about 40% by weight plasticizing oil.

In another embodiment, the thermoplastic composition includes block copolymer having the formula (A-B)x or A-B-A where the A block comprises polyvinylarene, the B block comprises poly(monoalkenyl), and x is an integer of at least one spherical superabsorbent particles that include polyacrylate and plasticizing oil, the composition exhibiting a water gel time of no greater than 2 minutes, a viscosity of no greater than 100,000 centipoise at 300° F. and a wet tensile strength of at least 15 g/in$^2$. In one embodiment, the composition exhibits a 0.9% saline solution gel time of no greater than 1 hour. In some embodiments, the composition exhibits a 0.9% saline solution gel time of no greater than 10 minutes. In other embodiments, the composition exhibits a water gel time of no greater than 1.5 minutes, a viscosity of no greater than 30,000 centipoise and a wet tensile strength of at least 40 g/in$^2$. In another embodiment, the composition exhibits an absorption capacity of at least 70 g water/g composition.

In some embodiments, the thermoplastic composition includes from about 1% by weight to 25% by weight block copolymer having the formula (A-B)x or A-B-A where the A block comprises polyvinylarene, the B block comprises poly(monoalkenyl), and x is an integer of at least one, from about 45% by weight to about 75% by weight superabsorbent polymer particles that include polyacrylate, and from about 15% by weight to about 40% by weight plasticizing oil, the composition exhibiting a water gel time of no greater than 2 minutes, and an absorption capacity of at least 70 g water/g composition and at least 10 g 0.9% saline solution/g composition.

In another aspect, the invention features an absorbent article that includes an absorbent core and an above-described composition incorporated in the absorbent core.

In one embodiment, the absorbent article that includes an absorbent core and an above-described composition disposed on the absorbent core.

In another aspect, the invention features an absorbent article that includes a liquid permeable sheet, a liquid impermeable barrier sheet, an absorbent element disposed between the liquid permeable sheet and the barrier sheet and an above-described thermoplastic composition disposed on at least one of the liquid permeable sheet, the barrier sheet and the absorbent element. In one embodiment, the absorbent article is selected from the group consisting of disposable diapers, sanitary napkins, wound care products, wipes, towels and tissues.

In one embodiment, the absorbent article includes a liquid permeable sheet, a liquid impermeable barrier sheet, an absorbent element disposed between the liquid permeable sheet and the barrier sheet and an above-described composition incorporated in the absorbent element.

The invention features a thermoplastic composition that exhibits a fast rate of absorption of water and aqueous saline solution, and a good absorption capacity for water and saline solution. The thermoplastic composition maintains good cohesive strength and adhesive integrity when wet, and exhibits a viscosity suitable for processing using standard hot melt equipment.

Other features of the invention will be apparent from the following description of the preferred embodiments thereof, and from the claims.

DETAILED DESCRIPTION OF THE PREFERRED EMBODIMENTS

The thermoplastic composition includes block copolymer, superabsorbent particles that include superabsorbent polyacrylate polymer, and plasticizing oil. The thermoplastic composition preferably exhibits a gel time, when exposed to water, of no greater than 3 minutes, preferably no greater than 2 minutes, more preferably no greater than 1.5 minutes, most preferably no greater than 1 minute and an average gel time, when exposed to a 0.9% aqueous saline solution, of no greater than 4 hours, preferably no greater than 1 hour, more preferably no greater than 25 minutes, most preferably no greater than 10 minutes, even more preferably no greater than 5 minutes.

The composition also exhibits an absorbent capacity of at least 60 g water/g composition, preferably at least 70 g water/g composition, more preferably at least 90 g water/g composition, more preferably at least 100 g water/g composition, most preferably at least 110 g water/g composition, and an absorbent capacity of at least 25 g 0.9% aqueous saline solution/g composition, preferably at least 30 g 0.9% aqueous saline solution/g composition, more preferably at least 35 g 0.9% aqueous saline solution/g composition.

The thermoplastic composition exhibits cohesive strength when wet and preferably exhibits a wet tensile strength of at least 15 g/in$^2$, more preferably at least 40 g/in$^2$, most preferably at least 60 g/in$^2$.

The thermoplastic composition preferably exhibits a viscosity no greater than about 100,000 cPs, preferably from about 10,000 cps to about 85,000 cps, more preferably from about 15,000 cps to about 65,000 cps, most preferably from about 15,000 cps to about 30,000 cps at 300° F. (149° C.).

Suitable block copolymers include linear and radial copolymer structures having the formula (A-B)x or A-B-A, where block A is a polyvinylarene block, Block B is a poly(monoalkenyl) block, and x is an integer of at least one. Suitable block A polyvinylarenes include, e.g., polystyrene, polyalpha-methylstyrene, polyvinyltoluene and combinations thereof. Suitable B blocks include, e.g., conjugated diene elastomers including, e.g., polybutadiene and polyisoprene, hydrogenated elastomers, ethylene/butylene (hydrogenated butadiene) and ethylene/propylene (hydrogenated isoprene), and combinations and mixtures thereof. Useful commercially available block copolymers are available under the Kraton D and Kraton G series of trade designations from Shell Chemical Company (Houston, Tex.) including, e.g., Kraton G-1651, the Europrene Sol T series of trade designations from EniChem Elastomers (Houston, Tex.), the Vector series of trade designations from Exxon (Dexco) (Houston, Tex.), Soprene series of trade designations from Enichem Elastomers and Stereon series of trade designations from Firestone Tire & Rubber Co. (Akron, Ohio).

The amount of block copolymer present in the thermoplastic composition is no greater than 25% by weight, preferably from about 1% by weight to about 20% by weight, more preferably from about 1% by weight to about 10% by weight, most preferably from about 1% by weight to about 7% by weight.

Alternately, the composition may include amorphous and crystalline polyolefins including homogeneous and substantially linear ethylene/alpha-olefin interpolymers, interpolymers of ethylene such as ethylene-vinylacetate, ethylene-methyl acrylate and ethylene n-butyl acrylate, and mixtures thereof.

Amorphous polyolefins or amorphous polyalphaolefins are homopolymers, copolymers, and terpolymers of $C_2$–$C_8$ alphaolefins. Commercially available amorphous polyalphaolefins include REXTAC (t and REXFlext) propylene-based homopolymers, ethylene-propylene copolymers, butene-propylene copolymers available from Rexene (Dallas, Tex.) and VESTOPLAST alpha-olefin copolymers available from Huls (Piscataway, N.J.).

Metallocene polyolefins are homogeneous linear and substantially linear ethylene polymers prepared using single-site or metallocene catalysts. Substantially linear ethylene polymers are commercially available from Dow Chemical Company and include polyolefin plastomers available under the AFFINITY trade designation, homogeneous linear ethylene polymers are available from Exxon Chemical Company under the trade designation EXACT. Homogeneous linear and substantially linear ethylene polymers having a relatively low density, ranging from about 0.855 to about 0.885, and a relatively low melt index, for example less than about 50 g/10 min.

The term "interpolymer" is used herein to indicate a copolymer, terpolymer, or higher order polymer having at least one other comonomer polymerized with ethylene. Interpolymers of ethylene are those polymers having at least one comonomer selected from the group consisting of vinyl esters of a saturated carboxylic acid wherein the acid moiety has up to 4 carbon atoms, unsaturated mono-or dicarboxylic acids of 3 to 5 carbon atoms, a salt of the unsaturated acid, esters of the unsaturated acid derived from an alcohol having 1 to 8 carbon atoms, and mixtures thereof. The melt index of the interpolymers of ethylene may range from about 50 g/10 min to about 2000, g/10 min from about 100 g/10 min to , from about 200 g/10 min to 1200g/10 min , and from about 400 g/10 min to 1200 g/10 min.

Examples of ethylene/unsaturated carboxylic acid, salt and ester interpolymers include ethylene/vinyl acetate, ethylene/acrylic acid and its ionomers, ethylene/methacrylic acid and its ionomers, ethylene/methyl acrylate, ethylene/ethyl acrylate, ethylene/n-butyl acrylate, and derivatives thereof.

Other thermoplastic polymers include polybutylene, polylactide, e.g., caprolactone polymers, and poly (hydroxybutyrate/hydroxyvalerate), certain polyvinyl alcohols, biodegradable copolyesters such as Eastman Copolyester 14766 (Eastman Chemical), linear saturated polyesters, examples of which are available under the trade designations DYNAPOL and DYNACOLL from Huls, poly(ethylene oxide) polyether amide and polyester ether block copolymers, examples of which are available under the trade designations PEBAX from Atochem and RITE-FLEX from Hoechst Celanese, and polyamide polymers, examples of which are available under the trade designations UNIREZ (Union Camp), VESTAMELT (Huls) and GRILTEX (EMS-Chemie).

The superabsorbent particles include superabsorbent polymer, which is also referred to as water-insoluble absorbent hydrogel-forming polymer, "hydrogel-forming" polymer and "hydrocolloid". Superabsorbent polymers have a water absorption capacity of from many times to 1000 times their own weight. Useful superabsorbent polymers include, e.g., crosslinked acrylate polymers, crosslinked products of vinyl alcohol-acrylate copolymers, crosslinked products of polyvinyl alcohols grafted with maleic anhydride, crosslinked products of acrylate-methacrylate copolymers, crosslinked saponification products of methyl acrylate-vinyl acetate copolymers, crosslinked products of starch acrylate graft copolymers, crosslinked saponification products of starch acrylonitrile graft copolymers, crosslinked products of carboxymethyl cellulose polymers and crosslinked products of isobutylene-maleic anhydride copolymers, and combinations thereof.

The superabsorbent particles preferably are spherical and have an average particle size of from about 20 $\mu$m to about 30 $\mu$m. The composition may include spherical superabsorbent particles having an average particle size of from 20 $\mu$m to 400 $\mu$m, from 200 $\mu$m to 400 $\mu$m, from 250 $\mu$m to 390 $\mu$m and from 250 $\mu$m to 350 $\mu$m.

Useful commercially available superabsorbent particles include, e.g., sodium polyacrylate superabsorbent particles available under the AQUA KEEP series of trade designations including, e.g., particles having an average particle size of from about 20 $\mu$m to about 30 $\mu$m available under the trade designation AQUA KEEP 10SH-NF, particles having an average particle size of from 200 $\mu$m to 300 $\mu$m available under the trade designation AQUA KEEP 10SH-P, particles having an average particle size of from 320 $\mu$m to 370 $\mu$m available under the trade designation AQUA KEEP SA60S, particles having an average particle size of from 350 $\mu$m to 390 $\mu$m available under the trade designations AQUA KEEP SA60SX, SA55SX II and SA 60SL II, and particles having an average particle size of from 250 $\mu$m to 350 $\mu$m available under the trade designation AQUA KEEP SA60N TYPE II from Sumitomo Seika Chemicals Col, Ltd. (Japan).

The amount of superabsorbent polymer present in the composition ranges from about 45% by weight to about 75% by weight, preferably from about 60% by weight to about 75% by weight, more preferably from about 65% by weight to about 72% by weight.

Useful plasticizing oils include, e.g., hydrocarbon oils low in aromatic content, mineral oil (e.g., Purity 35 mineral oil from PetroCanada Lubricants (Calgary, Canada)). Preferred plasticizing oils are paraffinic or naphthenic. Examples of suitable commercially available plasticizing oils are available under the trade designations Calsol 555 from Calumet Refining Co. (Chicago, Ill.), One example of a suitable commercially available solid recrystallizing plasticizer is available under the trade designation Benzolflex 352 form Velsicol, (Rosemont, Ill.).

The plasticizing oil is preferably present in the composition in an amount of from 15% by weight to about 40% by weight, more preferably from about 20% by weight to about 30% by weight, most preferably from about 25% by weight to about 30% by weight.

The thermoplastic composition may optionally include surfactant. Suitable surfactants include nonionic, anionic, and silicone surfactants. Preferred commercially available surfactants are available under the trade designations Aerosol OT 100 and Aerosol OT B (dioctyl ester of sodium sulfosuccinic acid), from Cytec Industries (West Paterson, N.J.), and Rhodacal DS 10 (sodium dodecyl benzene sulfonated) from Rhone Poulenc (Cranberry, N.J.).

When surfactant is present in the thermoplastic composition, the amount of surfactant is preferably no greater than about 5% by weight, more preferably from about 1% by weight to 5% by weight, most preferably from about 1% by weight to about 2% by weight.

The thermoplastic composition can also include other additives including, e.g., tackifying agents, waxes, antioxidants, pigments and combinations thereof.

Examples of suitable tackifying agents include wood rosin, tall oil rosin, tall oil derivatives, gum rosin, rosin ester resins, natural terpenes, synthetic terpenes, and petroleum based tackifying agents including, e.g., aliphatic, aromatic and mixed aliphatic-aromatic petroleum based tackifying resins. Useful hydrocarbon resins include, e.g., alpha-methyl styrene resins, branched and unbranched $C_5$ resins, $C_9$ resins and $C_{10}$ resins, styrenic and hydrogenated modifications thereof, and combinations thereof. One example of a useful commercially available tackifying resin is Zonatac 105 styrenated terpene resin from Arizona Chemicals Inc. (Panama City, Fla.). Examples of useful commercially available tackified thermoplastic adhesives include HL-1620-A, HL-2238 and HL-1500 thermoplastic adhesives available form H .B. Fuller company (Vadnais Heights, Minn.).

Tackifying agent may optionally be present in the composition. The amount of tackifying agent in the composition, when present, is preferably no greater than 40% by weight, more preferably no greater than 30% by weight.

The thermoplastic composition may be pelletized, or cast into molds or drums for subsequent processing including, e.g., remelting and application.

The thermoplastic composition is useful in a variety of forms including, e.g., coating, film, binder, fiber and woven and nonwoven webs. The thermoplastic composition can be applied to or incorporated in a variety of substrates including, e.g., woven and nonwoven webs, porous substrates, films, tape backings, absorbent articles including, e.g., disposable diapers, feminine napkins, medical dressings (e.g., wound care products) wipes, tissues, towels, sheets and components of absorbent articles including, e.g., absorbent cores, impermeable layers (e.g., backsheets), tissue (e.g., wrapping tissue), acquisition layers and woven and nonwoven web layers (e.g., top sheets, absorbent tissue), and combinations thereof.

The composition also has utility in applications including, e.g., moisture barriers (e.g., for optical cable applications), agricultural applications targeted at increasing humectancy, packaging (e.g., food and drug packaging) including components (e.g., sheets and tissues) for absorbing moisture and fluid (e.g., blood and juices), and building materials for preventing condensation and waterproofing. The composition is also useful as cable sheathing including, e.g., sheathing for underwater cables.

Various application techniques can be used to apply the thermoplastic composition to a substrate including, e.g., slot coating, spraying including, e.g., spiral spraying and random spraying, screen printing, foaming, engraved roller, extrusion and meltblown adhesive application techniques.

The invention will now be described further by way of the following examples. All parts, ratios, percents and amounts stated in the Examples are by weight unless otherwise specified.

EXAMPLES

Test Procedures

Test procedures used in the examples include the following.

Absorption Capacity for Water

Total absorption is determined by drawing-down a molten film or heat-pressing the thermoplastic composition into a film having a thickness of 20 mils or a coating weight of approximately 0.3 g/in$^2$. The film is then cut into a 1 inch (2.54 cm) square and weighed. The sample film is then placed in a 50 ml cup and 30 ml of water (or more if needed) is poured on top of the film. After 30 minutes the unabsorbed water is filtered off and weighed. The total amount of water absorbed is determined and the grams (g) of water absorbed per gram of composition is recorded as g water/g composite.

Water Gel Time Method

The water gel time is determined by drawing-down a molten film or heat pressing the thermoplastic composition into a film having a thickness of 20 mils (i.e., a coating weight of approximately 0.3 g/in$^2$ (6.45 g/cm$^2$). The film sample is then cut into a 1 inch (2.54 cm) square and weighed. The sample is then placed in a 25 ml cup, and 10 ml of water is poured on top of the film. A stopwatch is started and the time it takes for gelation to occur (i.e., the amount of time it takes for all of the water to be absorbed by the sample) is reported in minutes (min).

Absorption Capacity for 0.9% Aqueous Saline Solution

Total absorption capacity for 0.9% saline solution is determined by drawing-down a molten film or heat-pressing the thermoplastic composition into a film having a thickness of 20 mils or a coating weight of approximately 0.3 g/in$^2$. The film is then cut into a 1 inch (2.54 cm) square and weighed. The sample film is then placed in a 50 ml cup and 30 ml (or more if needed) of 0.9% aqueous saline solution is poured on top of the film. After 30 minutes the unabsorbed saline solution is filtered off and weighed. The total amount of 0.9% aqueous saline solution absorbed is determined and the grams (g) of 0.9% aqueous saline solution absorbed per gram of composition is recorded as g 0.9% aqueous saline solution/g composite.

0.9% Aqueous Saline Solution Gel Time

The gel time relative to 0.9% aqueous saline solution is determined by drawing-down a molten film or heat pressing the thermoplastic composition into a film having a thickness of 20 mils or a coating weight of approximately 0.3 g/in$^2$. The film sample is then cut into a 1 inch (2.54 cm) square and weighed. The sample is then placed in a 25 ml cup, and 10 ml of 0.9% aqueous saline solution is poured on top of the film. A stopwatch is started and the time it takes for gelation to occur (i.e., the amount of time it takes for all of the 0.9% aqueous saline solution to be absorbed) is reported.

Viscosity

The viscosity of the sample is determined using a Brookfield Laboratories DVII+ Viscometer. The spindle used is a SC-27 hot-melt spindle suitable for measuring viscosities in the range of from 10 to 100,000 centipoise. The sample is placed in the in a disposable aluminum sample chamber, which, in turn, is inserted in to a Brookfield Thermosel and locked into place. The sample is heated to 300° F., with additional sample being added until the melted sample is about 1 inch (2.5 cm) below the top of the sample chamber. The viscometer apparatus is lowered and the spindle is submerged into the sample. The viscometer is turned on and set to a shear rate that leads to a torque reading in the range of from 30% to 60%. Readings are taken every minute for about 15 minutes or until the values stabilize. The final reading is recorded in centipoises (cps).

Wet Tensile Strength Determination

The sample composition is drawn out as a 20 mil thick film and 2 in.×1 in. strips are cut from the film. Masking tape is applied to the terminal ½ in. of each end of each strip. The strip is soaked in 0.9% saline solution for 5 minutes and then gently dried of excess liquid. Within one minute, the sample is placed between the grips of an Instron tester (Instron Corporation, Canton, Mass.). Tensile strength testing is conducted at a cross-head speed of 12 in/min and the average value obtained on for 5 samples strips is reported in units of grams.

Examples 1–8

The thermoplastic compositions of each of Examples 1–8 were prepared by combining the components (other than the superabsorbent particles) in the amounts specified in Table 1 and heating the composition to about 300° F. while mixing. Superabsorbent particles, in the amount specified in table 1, were then added to the molten thermoplastic composition with mixing.

The compositions of Examples 1–8 were tested to determine water gel time, 0.9% aqueous saline solution gel time, absorbent capacity for water, absorbent capacity for 0.9% aqueous saline solution and viscosity. The wet tensile strength of Examples 6–8 was also measured. The results are reported in Table 1.

TABLE 1

| | Example | | | | | | | |
|---|---|---|---|---|---|---|---|---|
| Ingredients | 1 | 2 | 3 | 4 | 5 | 6 | 7 | 8 |
| NW-1067[1] | 52 | 44.5 | | | | | | |
| HL-1620-A[2] | | | 45 | | | | | |
| HL-2238[3] | | | | 45 | | | | |
| DP-8910[4] | | | | | 15 | | | |

TABLE 1-continued

| Ingredients | 1 | 2 | 3 | 4 | 5 | 6 | 7 | 8 |
|---|---|---|---|---|---|---|---|---|
| Zonatac 105[5] | | | | | 15 | | | |
| Calsol 5555 oil[6] | | | | | 15 | | 27 | 22.5 |
| HL-1500[7] | | | | | | 33 | | |
| Kraton G-1651[8] | | | | | | | 1.5 | 1.5 |
| Rhodacal DS-10[9] | | | 2 | 2 | 2 | 2 | 1 | 1 |
| AquaKeep 10SH-NF[10] | 48 | 55.5 | 53 | 53 | 53 | 65 | 70 | 75 |
| Water Gel Time | >25 min | 14.5 min | 8.25 min | 6 min | 2.25 min | 1.0 min | 1.5 min | 1.0 min |
| 0.9% Saline Solution Gel Time | >6 hrs | >6 hrs | >5 hrs | 3.5 hrs | >20 min | 9 min | 5 min | 10 min |
| Absorbent Capacity in water (g/g) | 2.2 | 44 | 60 | 32 | 68 | 75 | 116 | 118 |
| Absorbent Capacity in 0.9% Saline Solution (g/g) | 2.7 | 5.2 | 24.5 | 9.9 | 24.7 | 21 | 35.5 | 37 |
| Viscosity (cps) @ 300 F. | 21,000 | 88,000 | 85,000 | 92,000 | 65,000 | 24,000 | 65,000 | >100,000 |
| Wet Tensile Strength (g) | NT | NT | NT | NT | NT | 49 g | Soft rubber nature | Soft rubber nature |

NT = Not Tested
[1]NW-1067 styrene-isoprene-styrene block copolymer-based adhesive composition (H. B. Fuller Company).
[2]HL-1620-A styrene-isoprene-styrene block copolymer-based adhesive composition including hydrocarbon resin and plasticizer (H. B. Fuller Company).
[3]HL-2238 styrene-ethylene-butylene-styrene block copolymer-based adhesive composition including hydrocarbon resin and plasticizer (H. B. Fuller Company).
[4]DP-8910 polyethylene (Shell Chemical Company, Houston, Texas)
[5]Zonatac 105 styrenated terpene resin (Arizona Chemical, Panama City, Florida).
[6]Calsol 5555 naphthenic oil (Calumet Refining Co., Chicago, Illinois).
[7]HL-1500 styrene-isoprene-styrene block copolymer-based adhesive including hydrocarbon resin and plasticizer (H. B. Fuller Company)
[8]Kraton G-1651 styrene-ethylene-butadiene-styrene block copolymer (Shell Chemical Company)
[9]Rhodacal DS-10 sodium dodecylbenzene sulfonate (Rhone Poulenc, Cranberry, New Jersey).
[10]AquaKeep 10SH-NF superabsorbent particles having a median diameter of 20 $\mu$m to 30 $\mu$m (Sumitomo Seika, Osaka, Japan)

Other embodiments are within the claims.

What is claimed is:

1. A thermoplastic composition comprising:
   from about 1% by weight to 25% by weight block copolymer having the formula (A-B)x or A-B-A where the A block comprises polyvinylarene, the B block comprises poly(monoalkenyl), and x is an integer of at least one;
   from about 45% by weight to about 75% by weight superabsorbent polymer particles comprising polyacrylate and having a median particle diameter of from 20 $\mu$m to 30 $\mu$m; and
   from about 15% by weight to about 40% by weight plasticizing oil, and a viscosity of no greater than 100,000 centipoise at 300° F.

2. The thermoplastic composition of claim 1, further comprising surfactant.

3. The thermoplastic composition of claim 1, further comprising from about 1% by weight to about 5% by weight surfactant.

4. The thermoplastic composition of claim 1, comprising from 60% by weight to about 75% by weight said superabsorbent polymer.

5. The thermoplastic composition of claim 1, wherein the block copolymer is selected from the group consisting of styrene-isoprene-styrene, styrene-ethylene-butylene-styrene, styrene-ethylene-propylene-styrene, styrene-butadiene-styrene and combinations thereof.

6. The thermoplastic composition of claim 1, wherein said composition exhibits a water gel time of no greater than 2 minutes.

7. The thermoplastic composition of claim 1, wherein said composition exhibits a water gel time of no greater than 1.5 minutes.

8. The thermoplastic composition of claim 1, wherein said composition exhibits a water gel time of no greater than 1 minute.

9. The thermoplastic composition of claim 1, wherein said composition exhibits a 0.9% saline solution gel time of no greater than 4 hours.

10. The thermoplastic composition of claim 1, wherein said composition exhibits a 0.9% saline solution gel time of no greater than 1 hour.

11. The thermoplastic composition of claim 1, wherein said composition exhibits a 0.9% saline solution gel time of no greater than 25 minutes.

12. The thermoplastic composition of claim 1, wherein said composition exhibits a 0.9% saline solution gel time of no greater than 10 minutes.

13. The thermoplastic composition of claim 1, wherein said composition exhibits a 0.9% saline solution gel time of no greater than 5 minutes.

14. The thermoplastic composition of claim 1, wherein said composition exhibits an absorbent capacity of at least 60 g water/g of composition.

15. The thermoplastic composition of claim 1, wherein said composition exhibits an absorbent capacity of at least 70 g water/g of composition.

16. The thermoplastic composition of claim 1, wherein said composition exhibits an absorbent capacity of at least 90 g water/g of composition.

17. The thermoplastic composition of claim 1, wherein said composition exhibits an absorbent capacity of at least 100 g water/g of composition.

18. The thermoplastic composition of claim 1, wherein said composition exhibits an absorbent capacity of at least 110 g water/g of composition.

19. The thermoplastic composition of claim 1, wherein said composition exhibits an absorbent capacity of at least 25 g 0.9% saline solution/g of composition.

20. The thermoplastic composition of claim 1, wherein said composition exhibits an absorbent capacity of at least 30 g 0.9% saline solution/g of composition.

21. The thermoplastic composition of claim 1, wherein said composition exhibits an absorbent capacity of at least 35 g 0.9% saline solution/g of composition.

22. A thermoplastic composition comprising:
block copolymer having the formula (A-B)x or A-B-A where the A block comprises polyvinylarene, the B block comprises poly(monoalkenyl), and x is an integer of at least one;
spherical superabsorbent particles comprising polyacrylate and having a median particle diameter of from 20 $\mu$m to 30 $\mu$m; and
plasticizing oil,
said composition exhibiting water gel time of no greater than 2 minutes.

23. The thermoplastic composition of claim 22, wherein said block copolymer is selected from the group consisting of styrene-isoprene-styrene, styrene-ethylene-butylene-styrene, styrene-ethylene-propylene-styrene, styrene-butadiene-styrene and combinations thereof.

24. A thermoplastic composition comprising:
block copolymer having the formula (A-B)x or A-B-A where the A block comprises polyvinylarene, the B block comprises poly(monoalkenyl), and x is an integer of at least one;
spherical superabsorbent particles comprising polyacrylate and having a median particle diameter of from 20 $\mu$m to 30 $\mu$m; and
plasticizing oil,
said composition exhibiting a 0.9% saline solution gel time of no greater than 1 hour.

25. A thermoplastic composition comprising:
block copolymer having the formula (A-B)x or A-B-A where the A block comprises polyvinylarene, the B block comprises poly(monoalkenyl), and x is an integer of at least one;
spherical superabsorbent particles comprising polyacrylate and having a median particle diameter of from 20 $\mu$m to 30 $\mu$m; and
plasticizing oil,
said composition exhibiting an absorbent capacity of at least 70 g water/g of composition.

26. A thermoplastic composition comprising:
block copolymer having the formula (A-B)x or A-B-A where the A block comprises polyvinylarene, the B block comprises poly(monoalkenyl), and x is an integer of at least one;
spherical superabsorbent particles comprising polyacrylate and having a median particle diameter of from 20 $\mu$m to 30 $\mu$m; and
plasticizing oil,
said composition exhibiting an absorbent capacity of at least 25 g 0.9% aqueous saline solution/g of composition.

27. A thermoplastic adhesive composition comprising:
from about 1% by weight to 25% by weight block copolymer having the formula (A-B)x or A-B-A where the A block comprises polyvinylarene, the B block comprises poly(monoalkenyl), and x is an integer of at least one;
from about 45% by weight to about 75% by weight superabsorbent polymer particles comprising polyacrylate and having a median particle diameter of from 20 $\mu$m to 30 $\mu$m;
tackifying agent; and
from about 15% by weight to about 40% by weight plasticizing oil, said compostition having a viscosity of no greater than 100,000 centipoise at 300° F.

28. An absorbent article comprising:
an absorbent core;
the thermoplastic composition of claim 1 incorporated in said absorbent core.

29. An absorbent article comprising:
an absorbent core; and
the thermoplastic composition of claim 1 disposed on said absorbent core.

30. An absorbent article comprising:
a liquid permeable sheet;
a liquid impermeable barrier sheet;
an absorbent element disposed between the liquid permeable sheet and the barrier sheet; and
the thermoplastic composition of claim 1 disposed on at least one of said liquid permeable sheet, said barrier sheet and said absorbent element.

31. An absorbent article comprising:
a liquid permeable sheet;
a liquid impermeable barrier sheet;
an absorbent element disposed between the liquid permeable sheet and the barrier sheet; and
the thermoplastic composition of claim 1 incorporated in said absorbent element.

32. A thermoplastic composition comprising:
block copolymer having the formula (A-B)x or A-B-A where the A block comprises polyvinylarene, the B block comprises poly(monoalkenyl), and x is an integer of at least one;
spherical superabsorbent particles comprising polyacrylate; and
plasticizing oil,
said composition exhibiting a water gel time of no greater than 2 minutes, a viscosity of no greater than 100,000 centipoise at 300° F. and a wet tensile strength of at least 15 g/in$^2$.

33. The thermoplastic composition of claim 32, wherein said composition exhibits a 0.9% saline solution gel time of no greater than 1 hour.

34. The thermoplastic composition of claim 32, wherein said composition exhibits a 0.9% saline solution gel time of no greater than 10 minutes.

35. The thermoplastic composition of claim 32, wherein said composition exhibits a water gel time of no greater than 1.5 minutes, a viscosity of no greater than 30,000 centipoise at 300° F. and a wet tensile strength of at least 40 g/in$^2$.

36. The thermoplastic composition of claim 32, wherein said composition exhibits an absorption capacity of at least 70 g water/g composition.

37. A thermoplastic composition comprising:
   block copolymer having the formula (A-B)x or A-B-A where the A block comprises polyvinylarene, the B block comprises poly(monoalkenyl), and x is an integer of at least one;
   from about 45% by weight to about 75% by weight superabsorbent polymer particles that include polyacrylate; and
   from about 15% by weight to about 40% by weight plasticizing oil,
   said composition exhibiting a water gel time of no greater than 2 minutes, and an absorption capacity of at least 70 g water/g composition and at least 10 g 0.9% saline solution/g composition.
said compostion having a viscosity of no greater than 100,000 centipoise at 300° F.

38. A thermosplastic composition comprising:
   block copolymer having the formula (A-B)x or A-B-A where the A block comprises polyvinylarene, the B block comprises poly(monoalkenyl), and x is an integer of at least one;
   from about 45% by weight to about 75% by weight superabsorbent polymer particles comprising polyacrylate; and
   from about 15% by weight to about 40% by weight plasticizer,
   said composition exhibiting a viscosity of no greater than about 65,000 centipoise at 300° F.

39. A thermoplastic composition comprising:
   thermoplastic polymer selected from the group consisting of amorphous polyolefins, crystalline polyolefins, polylactides, polyvinyl alcohols, copolyesters, polyesters, poly(ehtylene oxide) polyether amides, polyester ether block copolymers, polyamides, and combinations thereof;
   from about 45% by weight to about 75% by weight superabsorbant polymer particles comprising polyacrylate; and
   from about 15% by weight to about 40% by weight plasticizer,
   said composition exhibiting a viscosity of no greater than about 65,000 centipoise at 300° F.

40. A thermoplastic composition comprising:
   from about 1% by weight to 25% by weight block copolymer having the formula (A-B)x or A-B-A where the A block comprises polyvinylarene, the B block comprises poly(monoalkenyl), and x is an integer of at least one;
   from 60% by weight to 75% by weight superabsorbent polymer particles comprising polyacrylate and having a median particle diameter of from 20μm to 30μm; and
   from about 15% by weight to about 40% by weight plasticizing oil.

41. An absorbent article according to claim 31 selected from the group consisting of disposable diapers, sanitary napkins, wound care products, wipes, towels and tissues.

* * * * *